May 29, 1928.
E. WANDERSLEB
1,671,558
FINDER FOR PHOTOGRAPHIC CAMERAS
Filed Aug. 4, 1927
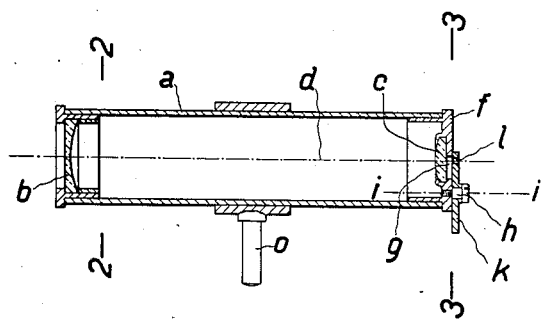
Fig.1
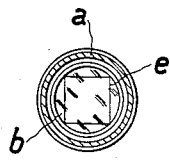   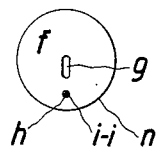   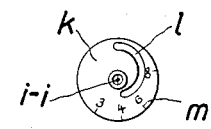
Fig.2        Fig.3        Fig.4
Inventor:

Patented May 29, 1928.

1,671,558

UNITED STATES PATENT OFFICE.

ERNST WANDERSLEB, OF JENA, GERMANY, ASSIGNOR TO THE FIRM: CARL ZEISS, OF JENA, GERMANY.

FINDER FOR PHOTOGRAPHIC CAMERAS.

Application filed August 4, 1927, Serial No. 210,684, and in Germany August 12, 1926.

The usual optical finders are generally mounted on photographic cameras in such a way that their sighting axis, which generally coincides with their optical axis, is parallel to the optical axis of the photographic objective. Strictly speaking such a finder only shows the correct sector of sight, corresponding to the photo taken, if the object to be photographed is located at a very great distance. However, in order to attain that also with near exposures the finder will indicate the correct sector of sight it is necessary that the sighting axis and the optical axis of the objective intersect in the object plane.

The new finder is fitted with a sighting point, which is displaceable transversely to the finder axis. Therefore it is possible to incline the sighting axis to the optical finder axis and to cause it to intersect the optical axis of the objective in the object plane. Preferably the displaceability is thereby attained that at the locus of the said sighting point there is rotatably disposed a disc whose axis of rotation is parallel to the optical finder axis at a finite distance from the latter and on which disc is provided on a spiral at different intervals from the axis of rotation and distributed about the same a plurality of marks which, by rotating the disc, may be brought in succession into a position in which they form the aforesaid sighting point. A continuous displacement of the sighting axis is attained by constructing the finder in such a way that all marks, provided on the aforesaid rotatable disc, form together an uninterrupted spiral and that besides this spiral there is provided at the locus of the said sighting point a fixed mark, directed approximately radial to the finder axis, the point of intersection of which mark with the spiral forms at any one time the sighting point.

The annexed drawing shows as a constructional example a finder according to the present invention. Fig. 1 is a longitudinal section of the finder, Fig. 2 is a section of the finder on the line 2—2 of Fig. 1, Fig. 3 shows a section on the line 3—3 of Fig. 1 and Fig. 4 shows a part of the finder from above.

Into a tubular casing $a$ is fitted a dispersive lens $b$ and a collective lens $c$ whose optical axes coincide in the axis of the casing $d$. The lens $b$ is provided with a rectangular mark $e$, which represents the image field of the photographic camera to be used with the finder. The mount of the lens $c$ is formed by a diaphragm-disc $f$, which is provided with a straight slit $g$, intersecting the optical axis $d$ of the lens $c$. Into the diaphragm-disc $f$ fits a screw $h$ in such a way that its axis $i$ is at a finite distance parallel to the axis $d$. The screw $h$ forms the axis of rotation of a diaphragm-disc $k$ provided with a spiral slit $l$. The diaphragm-disc $k$ is further provided with a scale $m$ which is adapted to the focussing scale of the camera to be used with the finder and for which the outer edge $n$ of the diaphragm-disc $f$ serves as an index. The finder is assumed to be fixed by means of a pivot $o$ on a suitable photographic camera in such a way that its axis $d$ is parallel to the optical axis of the photographic objective fitted to the camera and that the slit in the plane, determined by this optical axis and the axis $d$, lies on the side of the axis $d$, turned away from the objective.

The operation of the finder takes place in the following way. The sighting point, determining the sighting axis, is at any one time represented by the point of intersection of the two slits $g$ and $l$. The user of the finder looks through the sighting point and the lenses $c$ and $b$ at the object to be photographed, whereby the mark $e$ encloses at any one time an image-sector, corresponding to the image field of the photographic camera. If the object lies at a great distance, the diaphragm-disc $k$ must be rotated about its axis $i$ in such a way that the sighting point coincides with the axis of the casing $d$. If the object only lies at a short distance, it is necessary to turn the diaphragm-disc $k$ according to the scale $m$, whereby the sighting point recedes from the axis of the casing $d$ and the sighting axis intersects the axis of the casing $d$ at an increasing angle in the object plane. In that case the mark $e$ indicates at any one time the sector of sight, imaged by the photographic objective in the camera.

I claim:

1. Finder for photographic cameras comprising a casing, a dispersive optical member, a rectangular mark fixed on this dispersive member, a collective optical member whose optical axis coincides with the optical axis of the said dispersive member, the two members being fixed in the said casing, a diaphragm-disc covering the said collective member and mounted on the said casing rotatable about an axis, this axis of rotation being at a finite distance parallel to the optical axis of the said two members, a plurality of aperatures disposed in the said diaphragm-disc at different intervals from the said axis of rotation on a spiral curve, and a mark, which denotes a straight line, intersecting the optical axis of the said collective member.

2. Finder for photographic cameras comprising a casing, a dispersive optical member, a rectangular mark fixed on this dispersive member, a collective optical member whose optical axis coincides with the optical axis of the said dispersive member, the two members being fixed in the said casing, a diaphragm-disc covering the said collective member and mounted on the said casing rotatable about an axis, this axis of rotation being at a finite distance parallel to the optical axis of the said two members, a plurality of apertures disposed in the said diaphragm-disc at different intervals from the said axis of rotation on a spiral curve, a second diaphragm-disc covering the said collective member and provided with a mark, consisting of a slit, which denotes a straight line intersecting the optical axis of the collective member.

3. Finder for photographic cameras comprising a casing, a dispersive optical member, a rectangular mark fixed on this dispersive member, a collective optical member whose optical axis coincides with the optical axis of the said dispersive member, the two members being fixed in the said casing, a diaphragm-disc covering the said collective member and mounted on the said casing rotatable about an axis, this axis of rotation being at a finite distance parallel to the optical axis of the said two members, a plurality of apertures disposed in the said diaphragm-disc at different intervals from the said axis of rotation on a spiral curve, the said apertures forming a spiral slit, a second diaphragm-disc covering the said collective member and provided with a mark, consisting of a slit, which denotes a straight line intersecting the optical axis of the collective member.

ERNST WANDERSLEB.